US 11,731,766 B1
Aug. 22, 2023

(12) United States Patent
Ralph et al.

(10) Patent No.: US 11,731,766 B1
(45) Date of Patent: Aug. 22, 2023

(54) WEDGED CLAMPING DEVICE AND METHOD FOR AIRCRAFT SEAT FRAME

(71) Applicant: B/E Aerospace, Inc., Winston-Salem, NC (US)

(72) Inventors: Neil M. Ralph, Winston-Salem, NC (US); Ryan J. Suhre, Winston-Salem, NC (US); Stephen A. Puglisi, Greensboro, NC (US); Eric M. McKee, Oak Ridge, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/707,453

(22) Filed: Mar. 29, 2022

(51) Int. Cl.
*B64D 11/06* (2006.01)

(52) U.S. Cl.
CPC ...... *B64D 11/0648* (2014.12); *B64D 11/0696* (2013.01)

(58) Field of Classification Search
CPC .................................................. B64D 11/0648
See application file for complete search history.

(56) References Cited

U.S. PATENT DOCUMENTS

| | | |
|---|---|---|
| D277,526 S | 2/1985 | White |
| 5,553,923 A | 9/1996 | Bilezikjian |
| 6,749,266 B2 | 6/2004 | Williamson |
| 6,955,371 B2 | 10/2005 | French |
| D686,422 S | 7/2013 | Robinson |
| D750,392 S | 3/2016 | Wilkens |
| 9,580,175 B2 | 2/2017 | Velasco et al. |
| 9,764,844 B2 | 9/2017 | Le et al. |
| D840,701 S | 2/2019 | Scott et al. |
| D866,209 S | 11/2019 | Princip et al. |
| 10,518,886 B2 | 12/2019 | Velasco |
| D882,975 S | 5/2020 | Abelheira et al. |
| 10,737,601 B2 | 8/2020 | Gilbert |

(Continued)

FOREIGN PATENT DOCUMENTS

| | | | |
|---|---|---|---|
| CN | 108688814 A | * 10/2018 | ......... B64D 11/0647 |
| DE | 102006015515 A1 | 10/2007 | |

(Continued)

OTHER PUBLICATIONS

Keder Solutions, https://www.kedersolutions.com/products/.

(Continued)

*Primary Examiner* — Timothy J Brindley
(74) *Attorney, Agent, or Firm* — Suiter Swantz pc llo (57) ABSTRACT

A device for securing passenger seat frame structures (e.g., seat spreaders, legs) to a lateral crossbeam includes a wedged clamping device insertable into a pocket directly adjacent to a passage allowing the crossbeam to pass through the seat frame structure. The wedged clamping device has an upper face providing a locking taper angle and a lower arcuate face opposite the upper face and in contact with the crossbeam. When inserted into the pocket, the wedged clamping device provides a clamping force securing the seat frame structure to the crossbeam without driving a bolt through, deforming, or otherwise compromising the integrity of the crossbeam. The wedged clamping device accepts a tuning bolt through a lateral face; tightening the tuning bolt can more precisely control the amount of clamping force provided on the crossbeam.

15 Claims, 8 Drawing Sheets

(56) References Cited

U.S. PATENT DOCUMENTS

| | | | |
|---|---|---|---|
| 11,014,675 | B2 | 5/2021 | Velasco |
| D936,383 | S | 11/2021 | Scott et al. |
| 11,172,765 | B1 | 11/2021 | Zurian |
| 11,203,434 | B2 | 12/2021 | D'Alessio et al. |
| 2003/0094542 | A1 | 5/2003 | Williamson |
| 2009/0108132 | A1* | 4/2009 | Guttropf ............ B64D 11/0647 |
| | | | 297/452.18 |
| 2012/0098322 | A1 | 4/2012 | Muller |
| 2014/0183925 | A1 | 7/2014 | Clauser et al. |
| 2014/0375090 | A1* | 12/2014 | Wegenka ............... B60N 3/004 |
| | | | 297/445.1 |
| 2021/0315384 | A1 | 10/2021 | Oomen et al. |
| 2021/0387732 | A1 | 12/2021 | Salzer |
| 2022/0009639 | A1 | 1/2022 | Yvon et al. |

FOREIGN PATENT DOCUMENTS

| | | | | |
|---|---|---|---|---|
| JP | S61187783 U | 11/1986 | | |
| WO | WO-2017044157 A1 * | 3/2017 | ......... | B64D 11/0648 |
| WO | 2022000044 A1 | 1/2022 | | |

OTHER PUBLICATIONS

Bright, Craig, "These seven airlines are introducing new ecomony class seats", URL: https://www.businesstraveller.com/business-travel/2018/06/06/seven-airlines-introducing-new-economy-class-seats/, Business Traveller, Jun. 6, 2018.

Collins Aerospace, "Pinnacle® Economy Class Seating", URL:https://www.collinsaerospace.com/what-we-do/Commercial-Aviation/Cabin/Seating/Economy-Class, downloaded Feb. 11, 2022, 6 pages.

* cited by examiner

WEDGED CLAMPING DEVICE AND METHOD FOR AIRCRAFT SEAT FRAME

CROSS-REFERENCE TO RELATED APPLICATIONS

The present application is related to, and incorporates herein by reference in its entirety, concurrently filed U.S. patent application Ser. No. 17/707,504 and entitled SPRINGLESS DRESS COVER AND LOWER CLOSE-OUT SYSTEM FOR PASSENGER SEAT.

BACKGROUND

Seating for economy class passengers aboard commercial aircraft is often implemented as groups of adjacent passenger seats (e.g., two, three, or more) secured to a seat frame structure. For example, seat frame components include legs, which secure the seat frame structure to the cabin floor (e.g., via track fittings set into tracks extending longitudinally along the cabin floor), and seat spreaders, which separate individual seats from each other but also support individual seat bottom and seat back structures. The various seat frame components of a seating assembly must be securely attached to each other and capable of supporting various loads associated with safety testing and/or passenger transport. Accordingly, seat spreaders and legs may be attached to long crossbeams extending laterally across the group of passenger seats.

However, conventional approaches to securing seat frame components to a crossbeam may use bolts that pass through the seat frame and crossbeam components, reducing the strength of the crossbeam. Further, these approaches may depend on the proper torquing of bolts; overtightening of bolts may result in further weakening of, or damage to, the crossbeam.

SUMMARY

In a first aspect, a device for securing a crossbeam to a seat frame structure is disclosed. In embodiments, the device is a wedged clamping device insertable into a pocket extending partially or fully through a seat frame structure, e.g., a leg via which a passenger seat or group thereof is mounted to a vehicle floor. For example, the pocket lies directly adjacent (e.g., at an angle which may vary) to a passage extending laterally through the seat frame structure, e.g., an elliptical or circular passage through which a crossbeam may extend across a group of two or more seats, the crossbeam having an elliptical or circular cross section. In embodiments, the wedged clamping device has two side faces concealed by the pocket, one or two lateral faces including a bolt hole through which a threaded bolt may be driven to tighten the wedged clamping device within the pocket, a bottom face directly adjacent to the crossbeam, and an upper face opposite the bottom face. For example, the upper face defines a locking taper angle, e.g., between an inner height where the upper face joins an inside lateral face to an outer height where the upper face joins an outside lateral face, the outer height greater than the inner height. In embodiments, the wedged clamping device, when inserted into the pocket, exerts a downward clamping force (e.g., interference force) upon the crossbeam, e.g., a clamping force in a radial direction upon a crossbeam having a circular cross section, securing the seat frame structure to the crossbeam.

In some embodiments, the clamping force on the crossbeam is proportional to the extent to which the threaded bolt extends through the wedged clamping device, e.g., via the bolt hole in the lateral face.

In some embodiments, the wedged clamping device exerts the clamping force upon an arcuate, e.g., curved, section of the crossbeam (e.g., having an elliptical or circular cross section).

In some embodiments, the crossbeam is a substantially cylindrical crossbeam having a first diameter, and the bottom face of the wedged clamping device is an arcuate face associated with a second diameter greater than the first diameter.

In some embodiments, the seat frame structure includes a leg, a seat spreader (e.g., for separating two adjacent passenger seats), or a structure combining the two.

In some embodiments, the wedged clamping device is a first wedged clamping device inserted into the pocket adjacent to a second wedged clamping device, such that the inner lateral faces of the two wedged clamping devices are proximate or adjacent and both wedged clamping devices exert a clamping force upon the crossbeam.

In some embodiments, the threaded bolt extends at least partially through both the first and second wedged clamping devices.

In a further aspect, a seating assembly for a passenger vehicle is also disclosed. In embodiments, the seating assembly includes a group of two or more adjacent passenger seats supported by two or more seat frame structures, e.g., legs securing the seating assembly to the vehicle floor and/or seat spreaders separating individual seats from each other and supporting the seat bottoms and/or seatbacks thereof. The group of seat frame structures are connected to each other and stabilized by crossbeams extending laterally across the seating assembly, e.g., elliptical or cylindrical crossbeams having an elliptical or cylindrical cross section. Each seat frame structure is secured to each crossbeam (e.g., a forward and rear crossbeam extending substantially parallel across the seating assembly) by a wedged clamping device insertable into a pocket extending partially or fully through the seat frame structure, the pocket directly adjacent to a passage or channel extending through the seat frame structure and through which the crossbeam passes. In embodiments, each wedged clamping device has two side faces concealed by the pocket, one or two lateral faces including a bolt hole through which a threaded bolt may be driven to tighten the wedged clamping device within the pocket, a bottom face directly adjacent to the crossbeam, and an upper face opposite the bottom face. For example, the upper face defines a locking taper angle, e.g., between an inner height where the upper face joins an inside lateral face to an outer height where the upper face joins an outside lateral face, the outer height greater than the inner height. In embodiments, each wedged clamping device, when inserted into the pocket, exerts a downward clamping force (e.g., interference force) upon the crossbeam, e.g., a clamping force in a radial direction upon a crossbeam having a circular cross section, securing the seat frame structure to the crossbeam.

In some embodiments, the clamping force on a crossbeam due to each wedged clamping device is proportional to the extent to which the threaded bolt extends through the wedged clamping device, e.g., via the bolt hole in the lateral face.

In some embodiments, each wedged clamping device exerts the clamping force upon an arcuate, e.g., curved, section of the associated crossbeam (e.g., having an elliptical or circular cross section).

In some embodiments, each crossbeam is a substantially cylindrical crossbeam having a first diameter, and the bottom face of each associated wedged clamping device is an arcuate face associated with a second diameter greater than the first diameter.

In some embodiments, each seat frame structure includes a leg, a seat spreader (e.g., for separating two adjacent passenger seats), or a structure combining the two.

In some embodiments, a first and second wedged clamping device are inserted into a pocket mutually adjacent, such that the inner lateral faces of the two wedged clamping devices are proximate or adjacent and both wedged clamping devices exert a clamping force upon the associated crossbeam.

In some embodiments, the threaded bolt extends at least partially through both the adjacent first and second wedged clamping devices.

In some embodiments, the seating assembly is an aircraft seating assembly comprising a group of at least two, e.g., generally between two and five, aircraft passenger seats installable in a passenger cabin.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally to FIGS. 1A through 1F, a passenger seating assembly 100 is disclosed. The seating assembly 100 may include passenger seats 102, seatback 104, seat cushion 106, headrest 108, armrest 110, seat spreader 112, legs 114, seatpan 116, baggage rail 118, track fittings 120, in-flight entertainment (IFE) device 122, literature compartment 124, meal tray 126, steward step 128, and crossbeams 130.

In embodiments, the passenger seating assembly 100 may be implemented in a passenger cabin of an aircraft, e.g., in an economy class cabin. For example, the passenger seating assembly 100 is shown by FIGS. 1A through 1F as comprising a group of three passenger seats 102 (e.g., a window seat, middle seat, and aisle seat), but may alternatively be implemented as a group of two or more seats, e.g., two, four, or five seats depending upon the desired cabin configuration.

In embodiments, each passenger seat 102 may support an occupying passenger, e.g., via the seatback 104 and seat cushion 106. Individual passenger seats 102 may be separated from each other by seat spreaders 112 and armrests 110 attached thereto; armrests, for example, may include buttons or switches (not shown) for reclining the seatback 104.

In embodiments, the passenger seating assembly 100 may be fixed to a cabin floor of the passenger cabin via the legs 114 and track fittings 120. For example, whether two, three, four, or five passenger seats 102 are incorporated, the passenger seating assembly 100 may include two legs 114 (each leg comprising, e.g., a forward leg 114a and a rear leg 114b, referring in particular to FIGS. 3E and 3F), each of the forward leg and the rear leg attached by a track fitting 120 to a track (e.g., a set of two parallel tracks (not shown) extending along the passenger cabin in a substantially longitudinal direction). In embodiments, the seat spreaders 112 and legs 114, 114a-114b may be connected by crossbeams 130 extending laterally across the passenger seating assembly 100. For example, the crossbeams 130 may extend through passages in the seat spreaders 112 and/or legs 114, 114a-114b.

In embodiments, the passenger cabin may incorporate multiple rows of passenger seating assemblies 100, each row including a group of passenger seating assemblies in various configurations (e.g., 2-3, 3-3, 3-4-3, 2-5-2, etc.) and each passenger seating assembly including features for use by passengers occupying the passenger seating assembly directly aft. For example, each passenger seating assembly 100 may include a baggage rail 118 to accommodate carry-on luggage and personal items placed under a passenger seat 102 by the passenger occupying the passenger seat directly aft. Similarly, each passenger seat 102 may incorporate an IFE device 122, literature compartment 124, meal tray 126, and/or other features accessible to the passenger occupying the passenger seat directly aft.

Figure 1A:
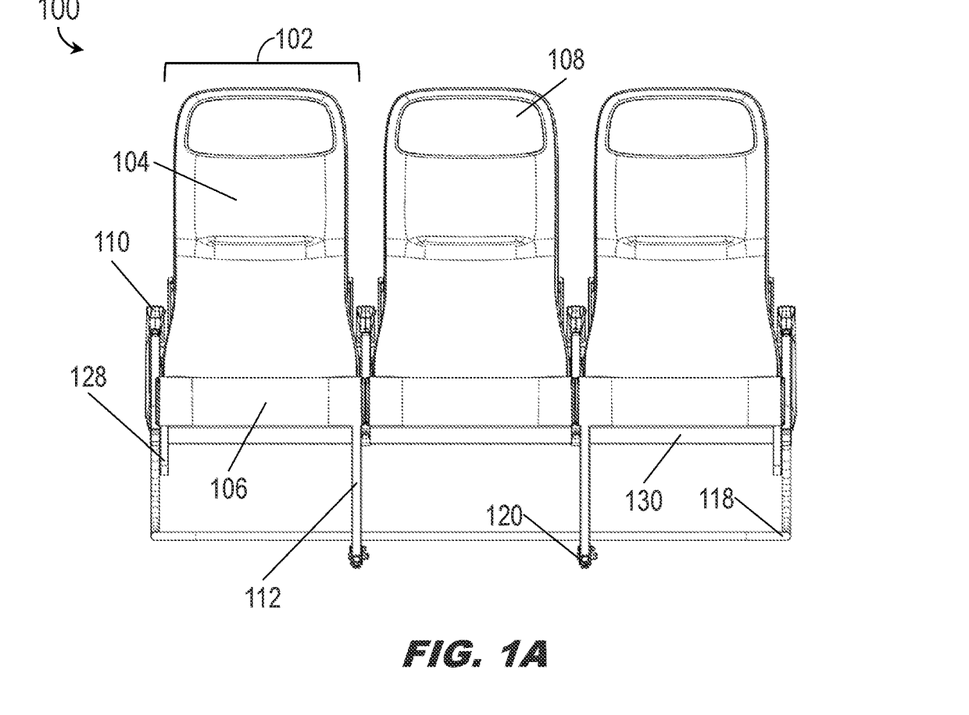
FIGS. 1A through 1F are respectively forward, rear, top, bottom, left-side, and right-side views of a vehicle passenger seating assembly.
Figure 1B:
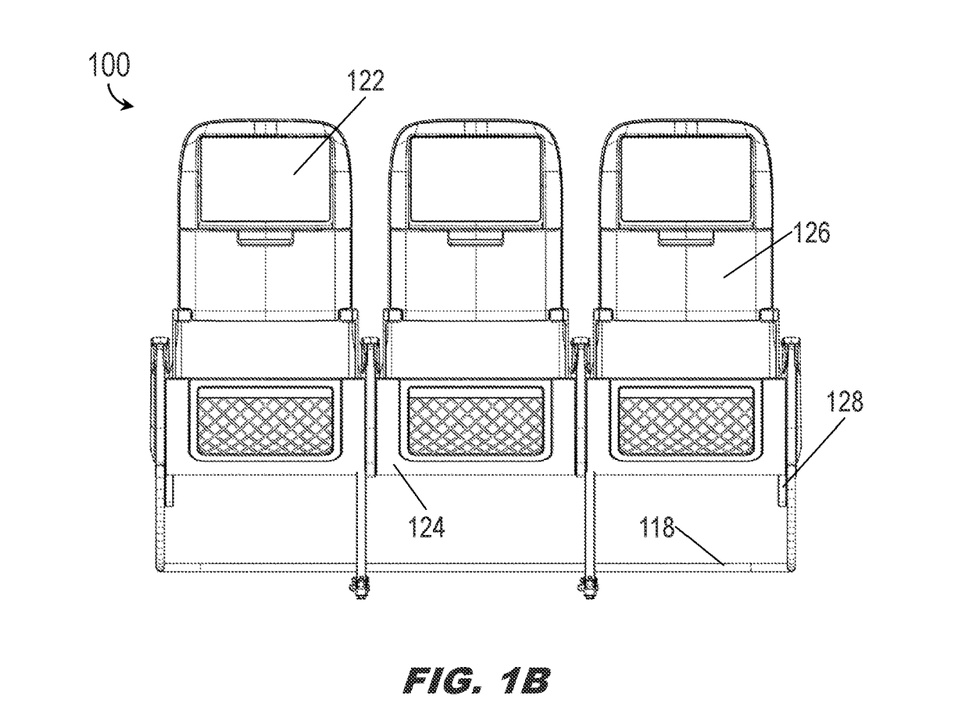
Figure 1C:
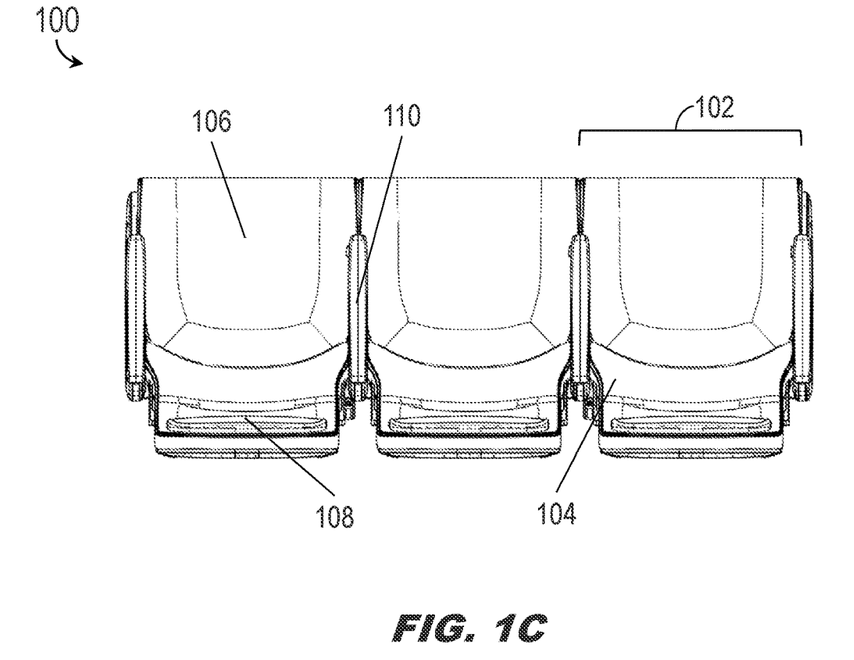
Figure 1D:
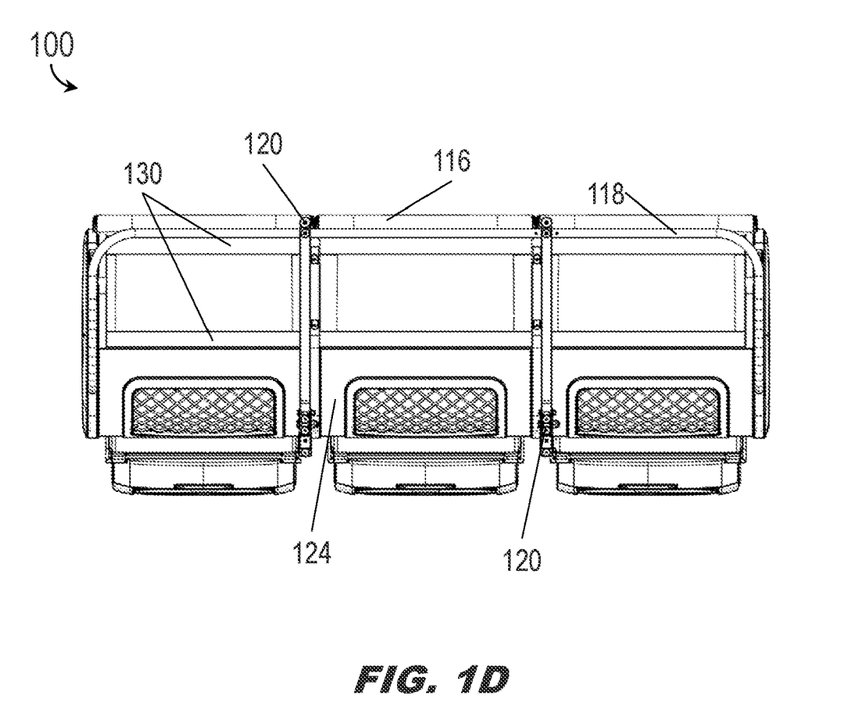
Figure 1E:
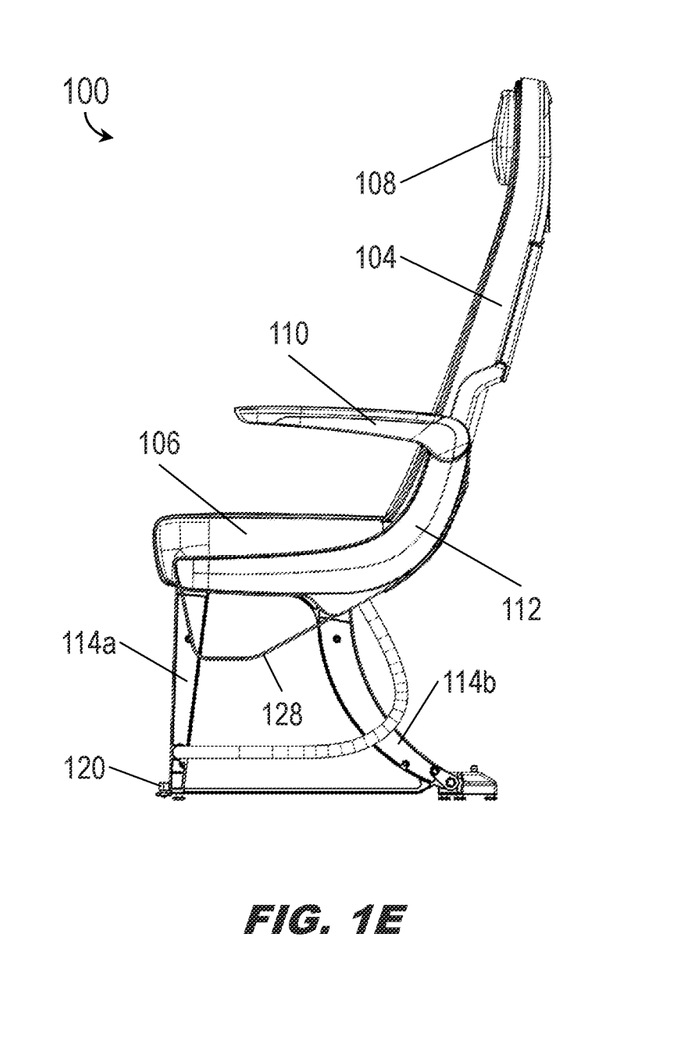
Figure 1F:
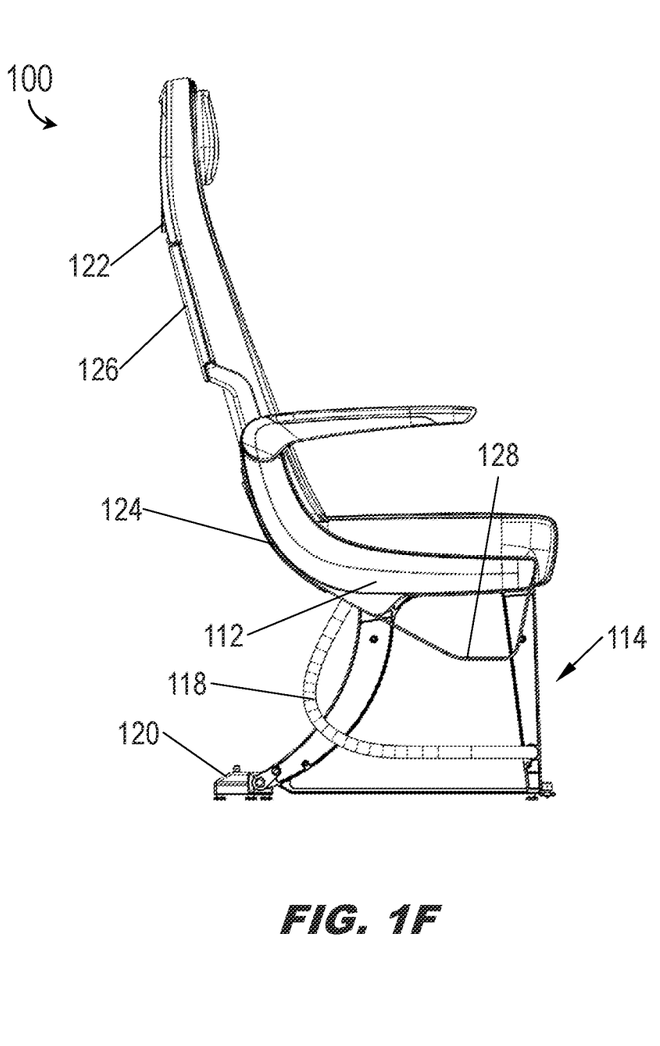

In some embodiments, referring in particular to FIGS. 1E and 1F, the passenger seating assembly 100 may incorporate a steward step 128 for the use of cabin crew and/or passengers who may need additional height to access overhead compartments. For example, the steward step 128 may extend below the seat spreader 112, e.g., on the aisle side of a passenger seat 102 proximate to a central aisle of an aircraft passenger cabin. In some embodiments, the passenger seating assembly 100 may exclude the steward step 128.

Figure 2:
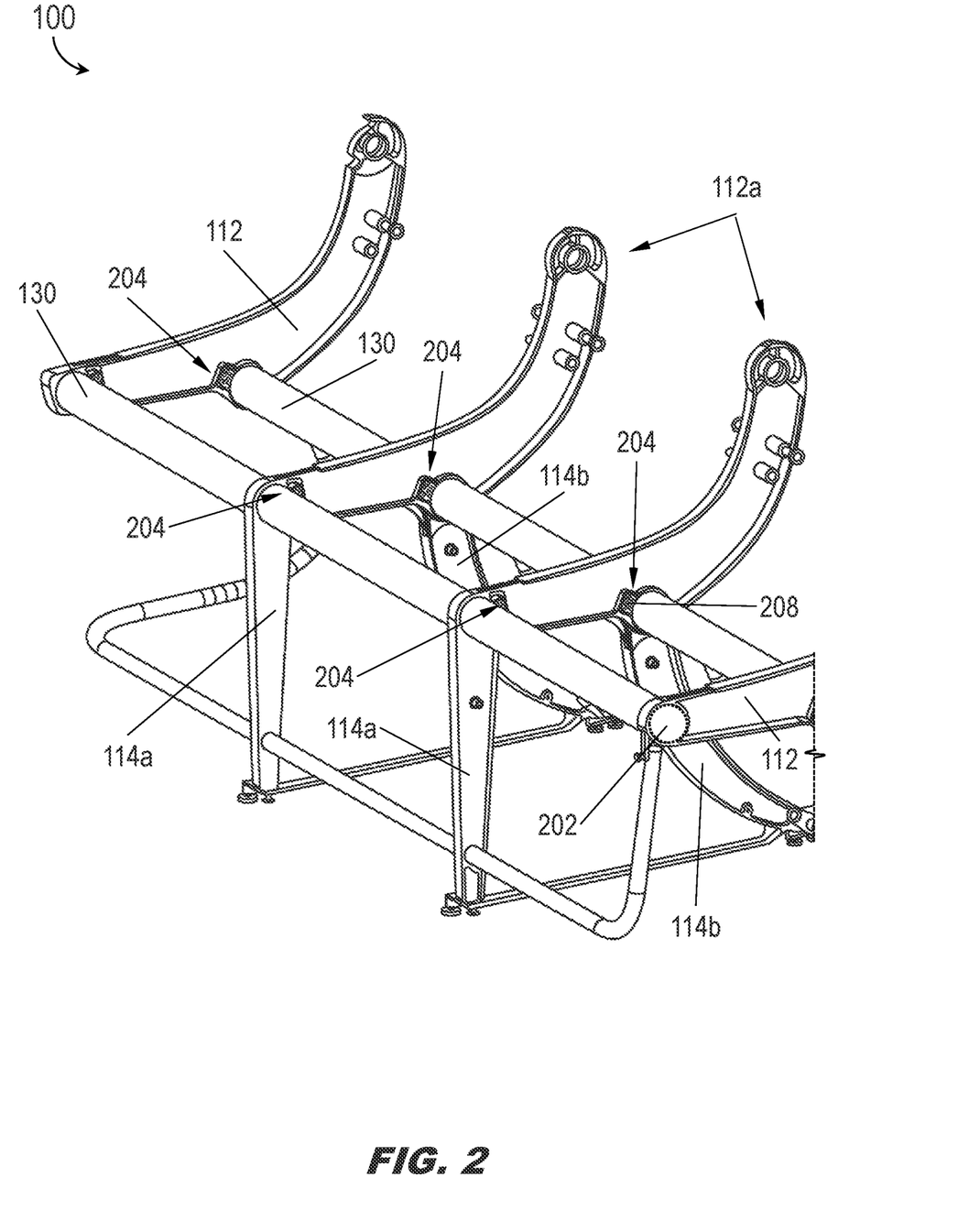
FIG. 2 is an isometric view of the underlying seat frame structures of the seating assembly of FIGS. 1A-F and wedged clamping devices according to example embodiments of this disclosure.

Referring now to FIG. 2, the passenger seating assembly 100 is shown.

In embodiments, the passenger seating assembly 100 may include crossbeams 130. For example, the underlying seat frame structure of the passenger seating assembly 100 may include seat spreaders 112 and seatpans (not shown) capable of supporting the seatbacks (104, FIGS. 1A-F) and seat cushions (106, FIGS. 1A-F) of each passenger seat (102, FIGS. 1A-F). The seatpans in turn may be supported by crossbeams 130 extending across the passenger seating assembly 100 in a lateral direction. Each seat spreader 112 and leg 114a-114b may be attached to the crossbeams 130; the passenger seating assembly 100 may include, for example, a front crossbeam and a rear crossbeam. In some embodiments, the passenger seating assembly 100 may incorporate seat spreaders 112 (e.g., at each terminal end of the crossbeams 130) and/or seat spreaders 112a integrating forward legs 114a and/or rear legs 114b into a single seat frame structure.

In embodiments, the crossbeams 130 may be cylindrical in shape, having a substantially elliptical or circular cross section. For example, each seat frame structure of the passenger seating assembly 100 (e.g., seat spreaders 112, 112a; legs 114, 114a-114b) may incorporate a passage 202 extending through the seat frame structure, the passage likewise having a substantially elliptical or circular shape to accommodate a crossbeam 130.

In embodiments, the passenger seating assembly 100 may incorporate wedged clamping devices 204 for securing component seat frame structures (e.g., seat spreaders 112, 112a; legs 114a-114b) to the crossbeams 130. For example, the wedged clamping devices 204 may replace bolts 206 (e.g., shown securing the seat spreaders 112 to the terminal ends of the crossbeam 130, e.g., by passing fully or partially through the crossbeam). In embodiments, each wedged clamping device 204 may be installed in a pocket or recession within the seat spreader 112a or leg 114a-114b and may exert a clamping force upon the crossbeam 130, securing the seat spreader or leg to the crossbeam without compromising the structural integrity of the crossbeam. In embodiments, the wedged clamping devices 204 may be of variable size, and set within the seat spreaders 112a or legs 114a-114b (e.g., within pockets/recessions set thereinto) at variable angles depending upon the desired amount of interference or clamping force. Further, each wedged clamping device 204 may incorporate a tuning bolt 208 insertable into the wedged clamping device. For example, the tuning bolt 208 may provide a means of fine-tuning the precise amount of clamping force upon the crossbeam 130 provided by the wedged clamping device.

Figure 3A:
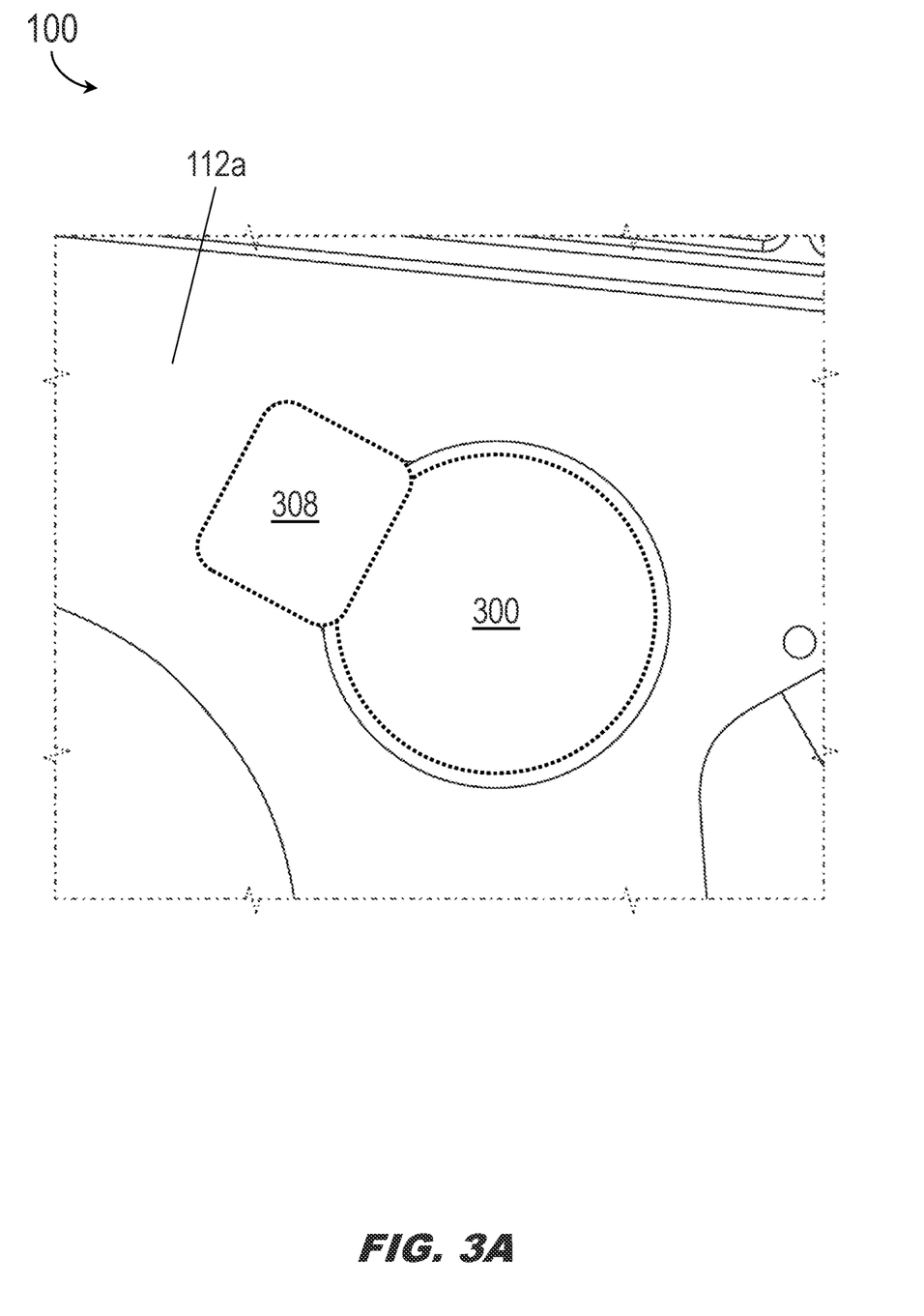
FIGS. 3A and 3B are partial profile views of the seat frame structure and wedged clamping device of FIG. 2.
Figure 3B:
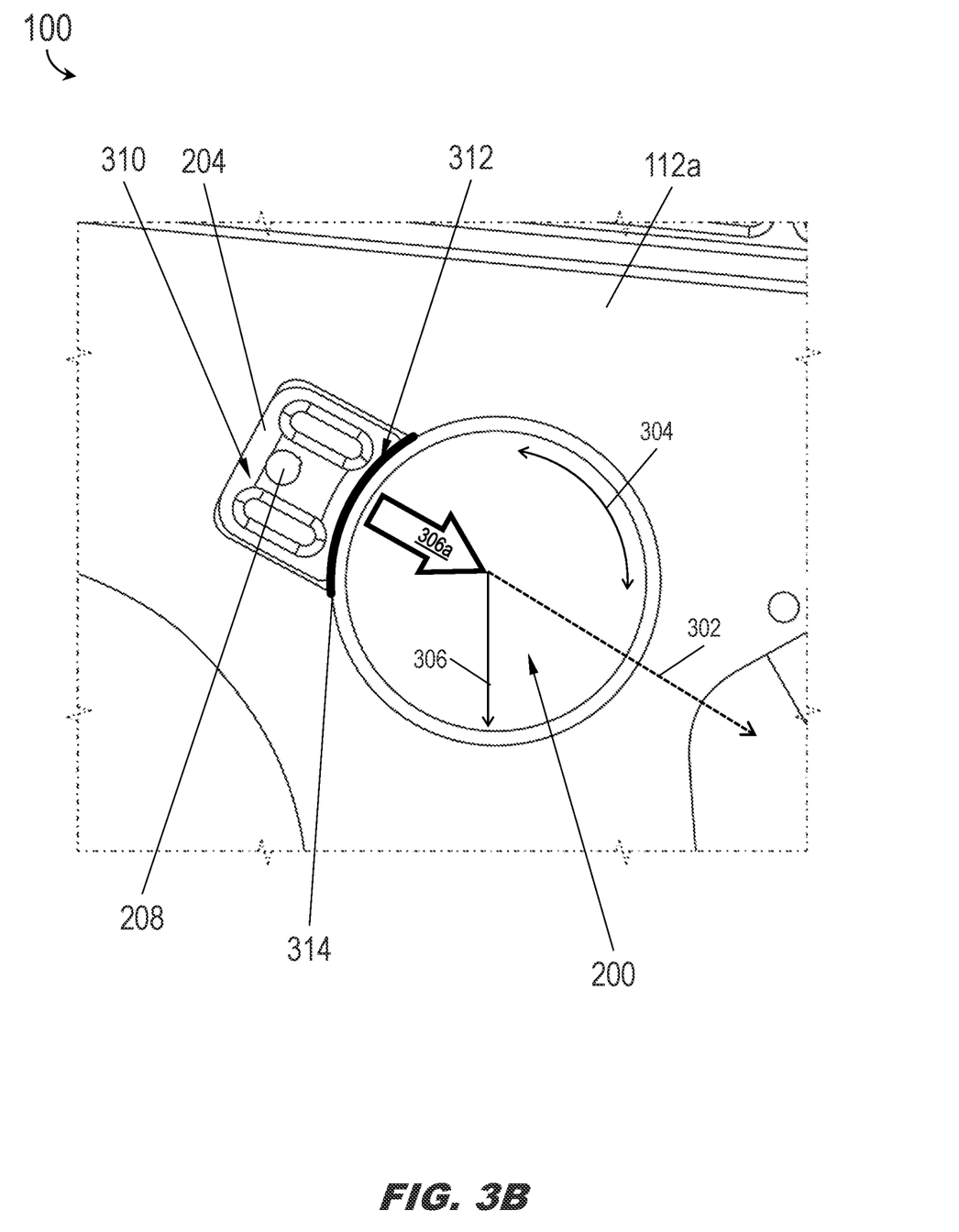

Referring now to FIGS. 3A and 3B, the seat spreader 112a (112, 112b) and passenger seating assembly 100 are respectively shown.

In embodiments, the seat spreader 112a may incorporate passages 300 extending fully through the seat spreader. For example, the passage 300 may have a substantially elliptical or circular shape such that the crossbeam 130 may pass through the seat spreader 112a via the passage. In embodiments, referring in particular to FIG. 3B, the passage 300 may be marginally larger in radius and diameter relative to the crossbeam 130, such that the crossbeam may be capable of a degree of free movement in the lateral direction 302 (e.g., parallel to the lateral axis of the crossbeam), or capable of a degree of rotation 304, but not capable of substantial movement in a radial direction 306.

Referring in particular to FIG. 3A, in embodiments the seat spreader 112a may include a pocket 308 extending fully or partially through the seat spreader. Referring also to FIG. 3B, the wedged clamping device 204 may be inserted into the pocket 308. For example, the wedged clamping device 204 may have a lateral face 310 substantially coplanar with the seat spreader 112a (e.g., a left-side lateral face as shown by FIG. 3B and an opposing right-side lateral face, not shown), the tuning bolt 208 insertable into the lateral face 310.

In embodiments, the wedged clamping device 204 may have an arcuate face 312 configured for directly contacting the crossbeam 130 when the wedged clamping device is inserted. For example, the arcuate face 312 may have an arcuate surface corresponding to an arc section of a circle of marginally greater diameter than that of the crossbeam 130. In embodiments, the wedged clamping device 204 inserted into the pocket 308 may exert a clamping force in a radial direction (306a) across an interference region 314 corresponding to an arc section of the outer surface of the crossbeam 130. For example, the precise amount of clamping force in the radial direction 306a may be controlled via the tuning bolt 208 (e.g., tightening the tuning bolt to increase the clamping force). Alternatively or additionally, the precise amount of clamping force may be determined in part by the precise amount of curvature (e.g., the radius/diameter size) associated with the arcuate face 312 (e.g., for securing the wedged clamping device 204 and the seat spreader 112a to the crossbeam 130 without deforming the crossbeam). In embodiments, the wedged clamping device 204 may be fashioned of aluminum, injection molded plastic, or any other like lightweight durable material.

Figure 4:
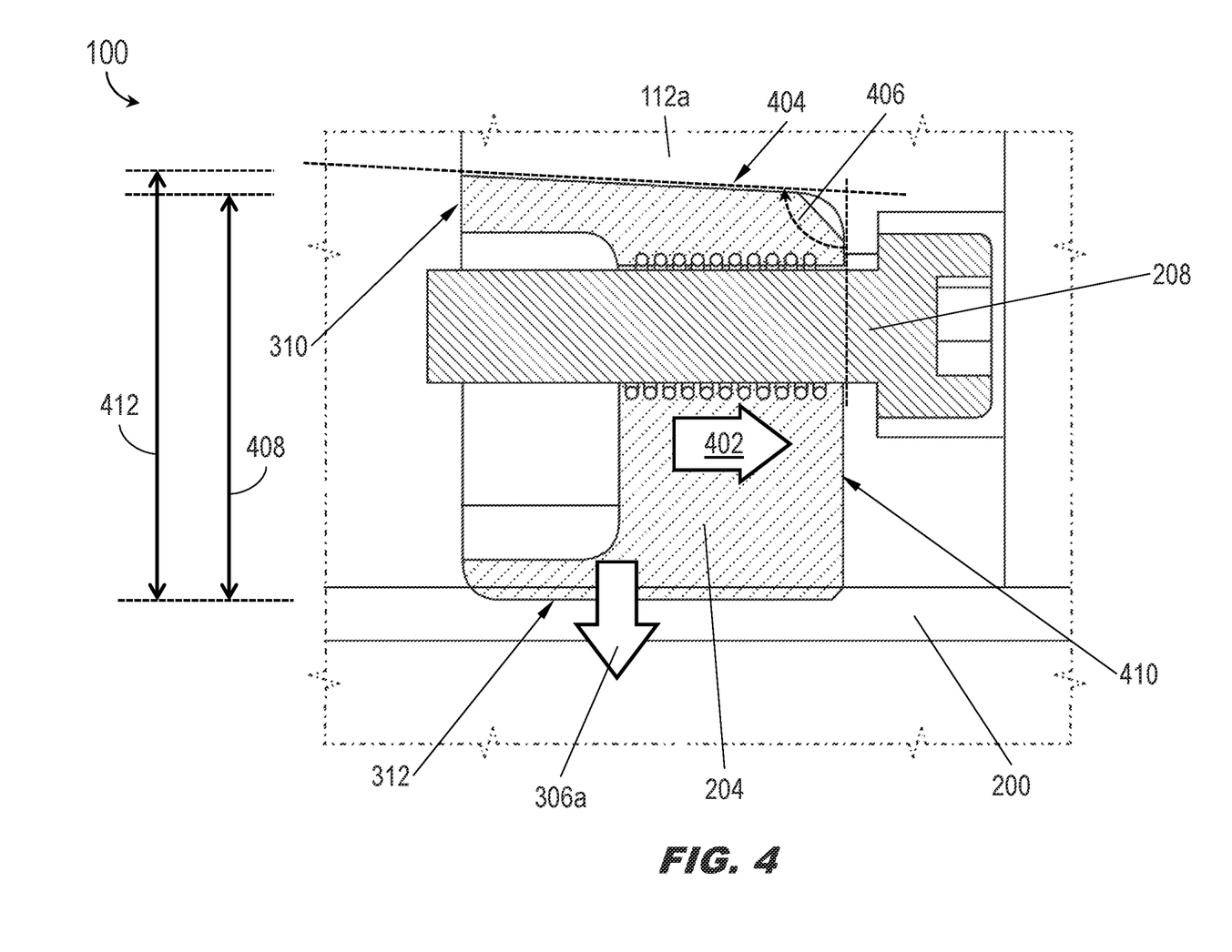
FIG. 4 is a cross-sectional view of the seat frame structure and wedged clamping device of FIG. 2.

Referring now to FIG. 4, the passenger seating assembly 100 is shown.

In embodiments, the pocket (308, FIG. 3A) may extend partially through the seat spreader 112a (112, 112b), and the wedged clamping device 204 may be inserted into the pocket. Further, the pocket 308 may include a bolt hole through which the tuning bolt 208 may be inserted into the wedged clamping device 204. For example, the wedged clamping device 204 may be internally threaded, and the tuning bolt 208 externally threaded, such that the tightening of the tuning bolt may draw the wedged clamping device 204 further into (402) the pocket 308 (e.g., closer to the seat spreader 112a), therefore increasing the clamping force on the crossbeam 130 in the radial direction 306a.

In embodiments, the wedged clamping device 204 may include an upper face 404 opposite the arcuate face 312 and corresponding to a locking taper angle 406. For example, the wedged clamping device 204 may have an inner height 408, e.g., associated with an inner face 410 opposite the lateral face 310 and proximate to the bolt hole 402. In embodiments, the locking taper angle 406 may refer to an angle of the upper face 404 (relative to the inner face 410) greater than 90 degrees, e.g., up to 100 degrees. For example, the precise amount of clamping force on the crossbeam 130 in the radial direction 306a may be at least partially dependent on the locking taper angle 406. Further, due to the locking taper angle, 406, the wedged clamping device 204 may have an outer height 412, e.g., associated with the outer lateral face 310, greater than the inner height 408.

As opposed to conventional passenger seating assemblies, which may require precise checking of the torque levels of any bolts attaching a seat spreader to the crossbeam, in embodiments the clamping force on the crossbeam 130 provided by the wedged clamping device 204 may be confirmed by visual inspection of the wedged clamping device, e.g., the level of the lateral face 310 relative to the exterior surface of the seat spreader 112a.

Figure 5A:
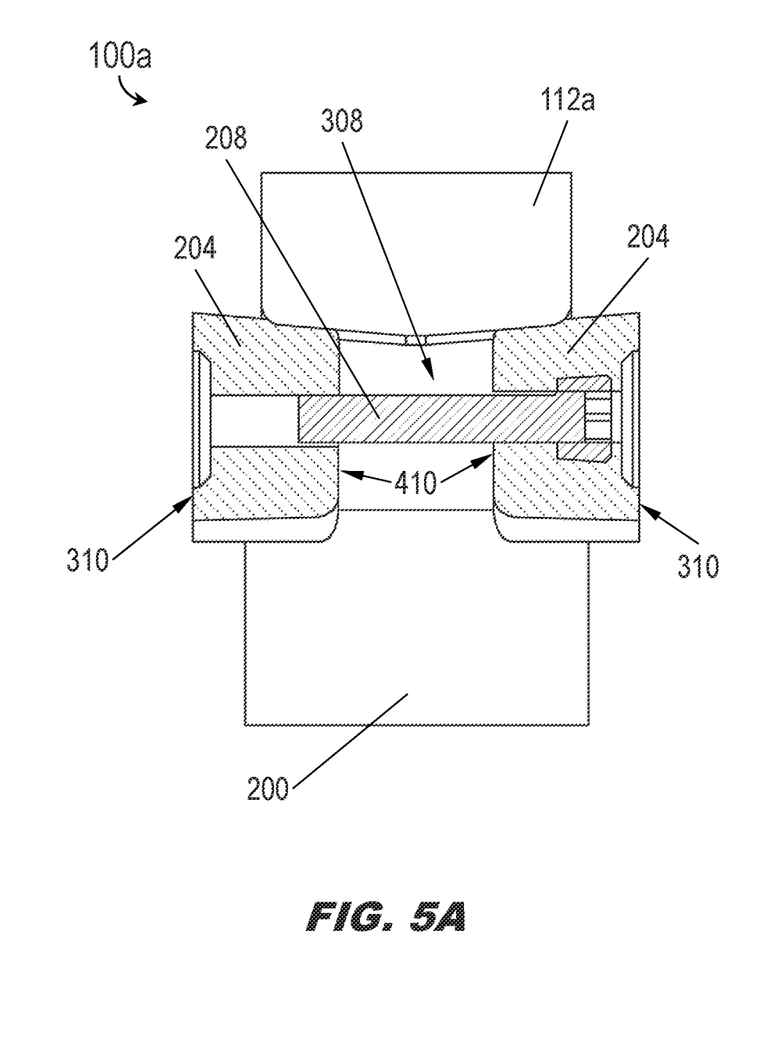
FIGS. 5A and 5B are cross sectional views of an alternative embodiment of the wedged clamping device of FIG. 2.
Figure 5B:
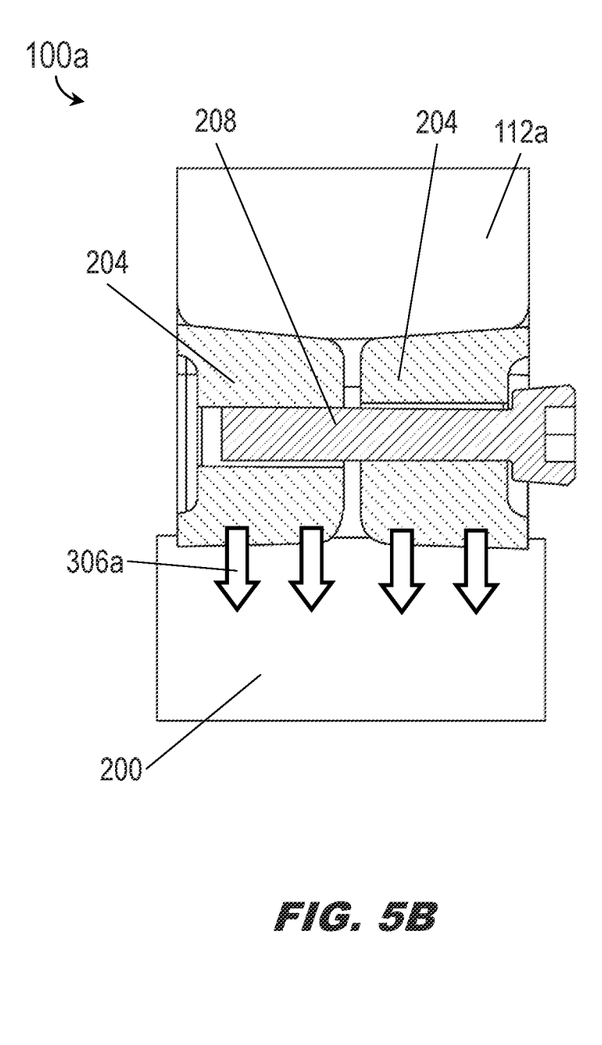

Referring now to FIGS. 5A and 5B, the passenger seating assembly 100a may be implemented and may function similarly to the passenger seating assembly 100 shown by FIGS. 1 through 4, except that the passenger seating assembly 100a may secure the seat spreader 112a (112, 112b) and/or leg 114 (114a, 114b) to the crossbeam 130 via one or more paired wedged clamping devices 204.

In embodiments, the pocket 308 may extend fully through the seat spreader 112a such that two adjacent wedged clamping devices 204 may be inserted into the pocket. For example, each wedged clamping device 204 may be inserted into the pocket such that the inner faces 410 of both wedged clamping devices are proximate or adjacent and the lateral faces 310 opposing, e.g., substantially coplanar with the exterior surfaces of the seat spreader 112a.

In embodiments, a tuning bolt 208 may be inserted through both wedged clamping devices 204 to tune the precise amount of clamping force on the crossbeam 130 provided by the wedged clamping devices. For example, the tightening of the tuning bolt 208 may drive the wedged clamping devices 204 toward each other, increasing the clamping force on the crossbeam 130 in the radial direction 306a.

Broadly speaking, embodiments of the inventive concepts disclosed herein secure seat frame structures to seating assembly crossbeams without compromising the strength of the crossbeams by adding holes into or through the crossbeams. Further, the wedged clamping devices disclosed herein add repeatable pressure to crossbeams that is not reliant on precise torquing of bolts. For example, threaded tuning bolts may be tightened until the wedged clamping device bottoms out, which is not only repeatable but makes overtightening of bolts impossible, and additionally avoids stress-related corrosion. Further, the wedged clamping device may be checked via simple visual inspection, e.g., the extent to which the wedged clamping device extends into, or protrudes from, the pocket (as opposed to conventional bolts which must be checked to verify the proper amount of torque).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A device for securing a crossbeam to a seat frame structure, comprising:
   at least one wedged clamping device insertable into a pocket extending through a seat frame structure in a lateral direction, the seat frame structure configured for supporting at least one vehicle seat and securing the vehicle seat to a floor of the vehicle;
   the pocket directly adjacent to an elliptical passage also extending through the seat frame structure in the lateral direction, the elliptical passage configured to accommodate a crossbeam having an elliptical cross section;
   the at least one wedged clamping device comprising:
     an interference face configured to be disposed adjacent to the elliptical crossbeam;
     at least one lateral face comprising a threaded bolt hole extending through the wedged clamping device in the lateral direction, the bolt hole configured to accommodate a threaded bolt;
     and
     an upper face opposite the interference face and corresponding to a locking taper angle, the upper face tapering from an outer height relative to the interference face to an inner height less than the outer height, the outer height associated with the lateral face;
   the at least one wedged clamping device configured to exert an interference force in a radial direction upon the elliptical crossbeam when the at least one wedged clamping device is inserted into the pocket.

2. The device of claim 1, wherein:
the interference force exerted upon the elliptical crossbeam is proportional to an extent to which the threaded bolt extends through the bolt hole.

3. The device of claim 1, wherein:
the wedged clamping device is configured to exert the interference force upon an arcuate section of the elliptical crossbeam.

4. The device of claim 1, wherein:
the elliptical crossbeam is a substantially cylindrical crossbeam having a substantially circular cross section associated with a first diameter;
and
the interference face comprises an arcuate surface associated with a second diameter greater than the first diameter.

5. The device of claim 1, wherein the seat frame structure includes at least one of a leg or a seat spreader.

6. The device of claim 1, wherein the at least one wedged clamping device comprises a first wedged clamping device and a second wedged clamping device, each of the first and second wedged clamping devices having an outer lateral face corresponding to the outer height and an inner lateral face corresponding to the inner height, the inner lateral faces mutually proximate and each outer lateral face associated with an exterior surface of the seat frame structure.

7. The device of claim 6, wherein the threaded bolt extends at least partially through the first and second wedged clamping devices.

8. A seating assembly for a passenger vehicle, the seating assembly comprising:
two or more passenger seats;
two or more seat frame structures including at least one of:
a leg configured for securing the two or more passenger seats to a floor of the passenger vehicle;
and
a seat spreader configured for supporting one or more of a seat bottom and a seatback;
the two or more seat frame structures connected by at least one crossbeam having an elliptical cross section and extending in a lateral direction through an elliptical passage extending through the two or more seat frame structures;
and
at least one wedged clamping device configured to secure each seat frame structure to each crossbeam, each wedged clamping device insertable into a pocket extending through the associated seat frame structure in the lateral direction, the pocket directly adjacent to the elliptical passage extending through the associated seat frame structure;
each wedged clamping device comprising:
an interference face configured to be disposed adjacent to the elliptical crossbeam;
at least one lateral face comprising a threaded bolt hole extending through the wedged clamping device in the lateral direction, the bolt hole configured to accommodate a threaded bolt;
and
an upper face opposite the interference face and corresponding to a locking taper angle, the upper face tapering from an outer height relative to the interference face to an inner height less than the outer height, the outer height associated with the lateral face;
each wedged clamping device configured to exert an interference force in a radial direction upon the elliptical crossbeam when the wedged clamping device is inserted into the pocket.

9. The seating assembly of claim 8, wherein:
the interference force exerted upon the elliptical crossbeam is proportional to an extent to which the threaded bolt extends through the bolt hole.

10. The seating assembly of claim 8, wherein:
the wedged clamping device is configured to exert the interference force upon an arcuate section of the elliptical crossbeam.

11. The seating assembly of claim 8, wherein:
the elliptical crossbeam is a substantially cylindrical crossbeam having a substantially circular cross section associated with a first diameter;
and
the interference face comprises an arcuate surface associated with a second diameter greater than the first diameter.

12. The seating assembly of claim 8, wherein the seat frame structure includes the leg and the seat spreader.

13. The seating assembly of claim 8, wherein the at least one wedged clamping device comprises a first wedged clamping device and a second wedged clamping device, each of the first and second wedged clamping devices having an outer lateral face corresponding to the outer height and an inner lateral face corresponding to the inner height, the inner lateral faces mutually proximate and each outer lateral face associated with an exterior surface of the seat frame structure.

14. The seating assembly of claim 13, wherein the threaded bolt extends at least partially through the first and second wedged clamping devices.

15. The seating assembly of claim 8, wherein the seating assembly comprises a group of two or more passenger seats installable in an aircraft passenger cabin.

* * * * *